Nov. 4, 1941. W. F. BOLDT 2,261,331
ADJUSTABLE MOUNTING FOR BRAKE SHOES
Filed Jan. 10, 1941
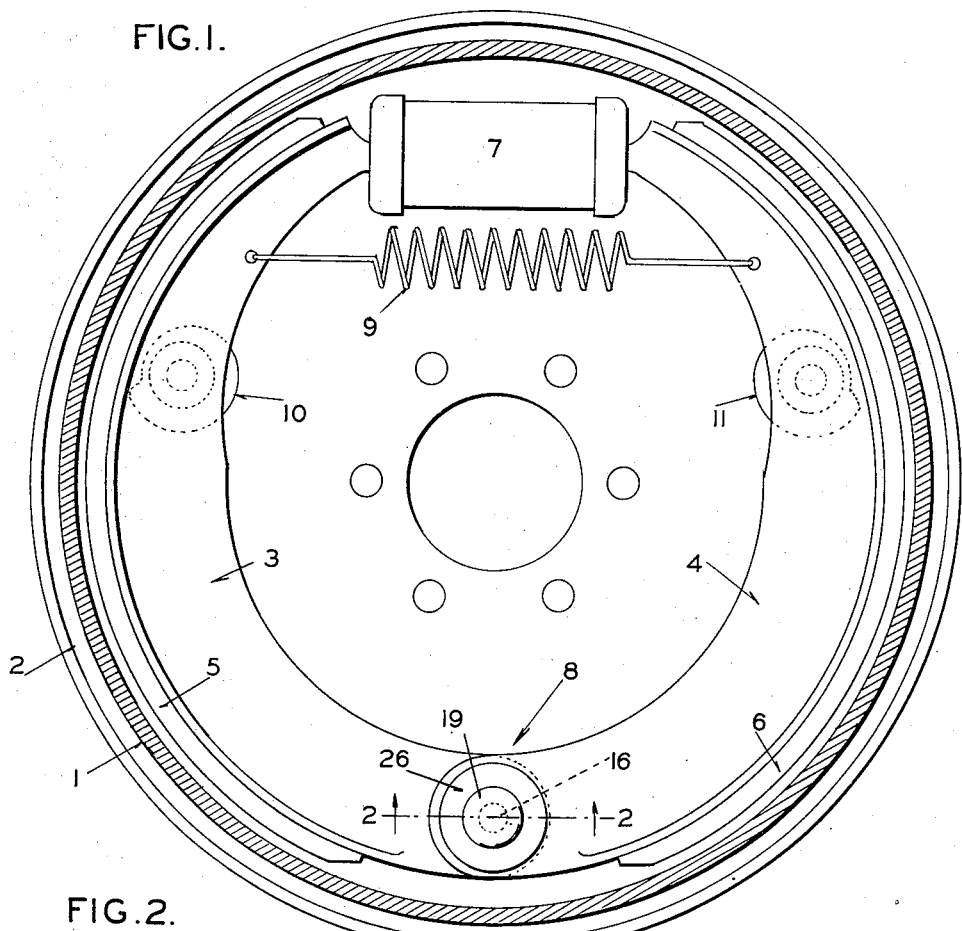
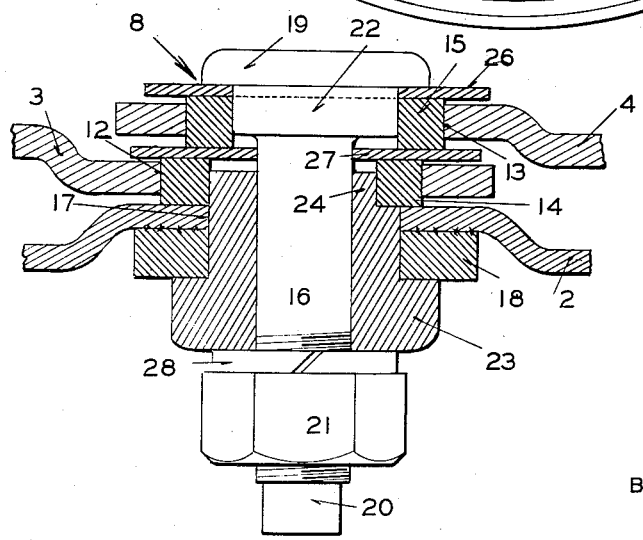
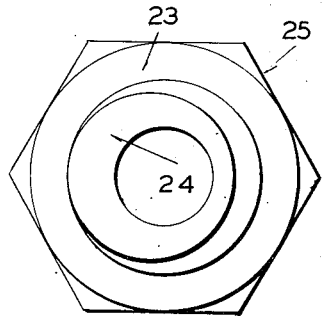
INVENTOR
W. F. BOLDT
BY
ATTORNEY Patented Nov. 4, 1941

2,261,331

UNITED STATES PATENT OFFICE 2,261,331

ADJUSTABLE MOUNTING FOR BRAKE SHOES

Werner F. Boldt, Clayton, Mo., assignor to Wagner Electric Corporation, St. Louis, Mo., a corporation of Delaware Application January 10, 1941, Serial No. 373,872

11 Claims. (Cl. 188—79.5)

My invention relates to braking mechanism and more particularly to an adjustable mounting for two brake shoes.

One of the objects of my invention is to provide in a brake embodying two pivotally connected shoes means for adjusting said shoes independently.

Another and more specific object of my invention is to provide an adjustable mounting for two shoes which will permit both shoes to be pivotally anchored on a single anchor pin and to be independently adjustable.

Other objects of my invention will become apparent from the following description taken in connection with the accompanying drawing in which Figure 1 is a view of a brake assembly embodying my invention, the drum being shown in section; Figure 2 is a sectional view taken on the line 2—2 showing the adjustable mounting for the shoes; and Figure 3 is an end view of the adjusting sleeve.

Referring to the drawing in detail, the numeral 1 indicates a brake drum secured to a rotating member such as a vehicle wheel and 2 a support or backing plate enclosing the open side of the drum and secured to a fixed member as is usual practice. Within the drum are two brake shoes 3 and 4 provided, respectively, with linings 5 and 6 for cooperation with the drum. The upper ends of the shoes are shown as being actuated by a double piston fluid motor 7 connected to a suitable source of pressure such as a master cylinder device (not shown). The lower or heel ends of the shoes are pivoted together on the backing plate by my improved adjustable mounting means generally indicated by the numeral 8 which provides an anchor for the shoes and permits them to be independently adjusted to compensate for lining wear. A spring 9 normally retracts the shoes away from the drum against adjustable stops 10 and 11.

Referring particularly to Figures 2 and 3, the heel ends of the shoes 3 and 4 overlap and are provided, respectively, with bearing openings 12 and 13 which receive annular bearings 14 and 15. These bearings have extending therethrough an anchor bolt 16 which also extends through an opening 17 in the backing plate and a reinforcing member 18 welded to said backing plate. The inner end of the bolt is provided with a flanged head 19 and the outer end is provided with threads and a square portion 20, said threads receiving a nut 21.

The portion 22 of the bolt adjacent the head is of larger diameter than the body with its axis eccentric to that of the bolt in order to form an eccentric portion. The diameter of this eccentric portion is such as to snugly fit in the bearing 15 of shoe 4. The main body of the bolt has mounted thereon a sleeve 23 which snugly fits into the opening 17 and on the inner end of this sleeve is an eccentric portion 24, the diameter of which is such as to snugly fit in bearing 14 for shoe 3. The outer end of the sleeve 23 is enlarged and provided with a hex head 25 to receive a suitable tool whereby said sleeve can be turned relative to the anchor bolt.

In order to maintain the shoes in position on their bearings a washer 26 is positioned between the head of the bolt and the bearing 15 and a second washer 27 is positioned between the two bearings 14 and 15. A lock washer 28 is also provided between the hex head of the sleeve and the nut 21. When the nut 21 is screwed up on the anchor bolt, the hex head of the sleeve will be clamped against the reinforcing member 18 of the backing plate and the bearings 14 and 15 will be clamped between the bolt head 19 and the inner surface of the backing plate. Thus the bolt, the sleeve and the bearings will all be held against rotation. In order to insure clamping action, it is to be noted that the axial lengths of the eccentric portion 22 on the bolt and the eccentric portion 24 on the sleeve are less than the thickness of the bearings.

By means of the construction just described it is apparent that both shoes will be anchored on the backing plate by a single anchor bolt. Each shoe is capable of being adjusted independently of the other. Thus if it is desired to adjust the heel end of shoe 4, nut 21 is loosened and the bolt turned by a tool cooperating with the square end 20. The eccentric portion 22 thus shifts the bearing 15 and shoe end. If it is desired to adjust the heel end of shoe 3, the nut is also loosened and the sleeve 23 rotated relative to the anchor bolt by a tool cooperating with the hex head 25 of the sleeve. The eccentric portion 24 shifts the bearing 14 and shoe end. After an adjustment is made, the nut is screwed up and the bolt and sleeve held in adjusted position. If either the bolt or sleeve should have a tendency to turn while the other is being turned during adjusting, this can be prevented by the use of a tool to hold the member not being adjusted.

By means of the adjustable mounting means just described a brake can be constructed which employs only a single anchor bolt yet the heel ends of the shoes can be independently adjusted. The use of the single anchor bolt permits the shoes to extend over a greater arc of the drum and consequently the area of lining can be increased for a brake of given drum diameter and shoe width. Independent adjustment of the shoes is available in the same manner as when an anchor bolt is used for each shoe as is now common practice.

Being aware of the possibility of modifications in the particular structure herein described without departing from the fundamental principles of my invention, I do not intend that its scope be limited except as set forth by the appended claims.

Having fully described my invention, what I claim as new and desire to secure by Letters Patent of the United States is:

1. In braking mechanism, two shoes provided with overlapping ends, a pin provided with an eccentric portion upon which the end of one shoe is mounted, a sleeve rotatably mounted on the pin and provided with an eccentric portion upon which the end of the other shoe is mounted, and means for holding the pin and sleeve from relative movement.

2. In braking mechanism, two shoes provided with overlapping ends, a pin, a sleeve mounted on the pin to rotate on the same axis thereof, means for mounting the end of one shoe on the pin and comprising a cylindrical surface carried by the pin the axis of which is eccentric to the axis of the pin, means for mounting the end of the other shoe on the sleeve and comprising a cylindrical surface carried by the sleeve the axis of which is eccentric to the axis of the sleeve, and means for holding the pin and sleeve against relative movement.

3. In braking mechanism, two shoes provided with overlapping ends, a pin having a head at one end and threads adjacent the other end, a sleeve mounted on the pin to rotate on the same axis thereof, means for mounting the end of one shoe on the pin and comprising a cylindrical surface carried by the pin the axis of which is eccentric to the axis of the pin, means for mounting the end of the other shoe on the sleeve and comprising a cylindrical surface carried by the sleeve the axis of which is eccentric to the axis of the sleeve, and a nut cooperating with the threads and the sleeve for holding the pin and sleeve against relative movement.

4. In braking mechanism, a support, two shoes, means for mounting the adjacent ends of the shoes on the support for independent adjustment, said means comprising two members mounted for rotation relatively to each other and on the same axis, each of said members having an eccentric portion upon which the end of a shoe is pivotally mounted, means for mounting the members on the support, and releasable means for preventing the two members from having relative rotative movement.

5. In braking mechanism, a support, a drum, two shoes for cooperation with the drum, a pin, a sleeve mounted on the pin for relative rotative movement, means for mounting said pin and sleeve on the support, means for mounting the end of one shoe on the pin for adjustment relative to the drum and support when the pin is rotated independently of the sleeve, and means for mounting the end of the other shoe on the sleeve for adjustment relative to the drum and support when the sleeve is rotated independently of the pin.

6. In braking mechanism, a support, two shoes provided with adjacent ends, a pin, a sleeve mounted on the pin to rotate on the same axis thereof, means for mounting the end of one shoe on the pin and comprising a cylindrical surface carried by the pin the axis of which is eccentric to the axis of the pin, means for mounting the end of the other shoe on the sleeve and comprising a cylindrical surface carried by the sleeve the axis of which is eccentric to the axis of the sleeve, means for mounting the pin and sleeve on the support, and means for holding the pin and sleeve from relative rotative movement with respect to the support.

7. In braking mechanism, a drum, a support, two shoes for cooperation with the drum and having overlapping ends, an anchor pin provided with an eccentric portion upon which the end of one shoe is pivotally mounted, a sleeve rotatably mounted on the pin and provided with an eccentric portion upon which the end of the other shoe is pivotally mounted, and means comprising a releasable nut on the pin for holding the pin and sleeve from relative rotative movement with respect to each other and the support.

8. In braking mechanism, a drum, a support, two shoes for cooperation with the drum and having overlapping ends, an anchor pin provided with an eccentric portion upon which the end of one shoe is pivotally mounted, a sleeve rotatably mounted on the pin and provided with an eccentric portion upon which the end of the other shoe is pivotally mounted, and means including a nut threaded on the pin and cooperating with the sleeve for clamping the pin and sleeve on the support to prevent relative rotative movement.

9. In braking mechanism, a support provided with an opening, two shoes provided with overlapping ends having openings therein, bearing rings for the openings of the shoes, a bolt extending through the bearing rings and the support opening and provided with a head, said bolt having an eccentric portion adjacent the head upon which a bearing ring is mounted, a sleeve mounted on the bolt and journaled in the support opening, said sleeve having an eccentric portion upon which the other bearing ring is mounted, and a member cooperating with the bolt and sleeve for clamping the bearing rings between the bolt head and the support and the sleeve to the support to thereby prevent relative rotative movement between the pin, the sleeve and the support.

10. In braking mechanism, a support, a drum, two shoes for cooperation with the drum and provided with overlapping ends having openings therein, annular bearings positioned in the openings, a pin provided with an eccentric portion upon which one bearing is mounted, a sleeve rotatably mounted on the pin and having an eccentric portion upon which the other bearing is mounted, said sleeve being rotatably mounted on the support and provided with a tool receiving portion engageable with the support, said pin being provided with a head at one end, with a tool receiving portion at the other end and with a thread, and a nut on the pin for clamping the bearings between the head and support and also the sleeve to the support.

11. In braking mechanism, two shoes provided with overlapping ends, a pin provided with an eccentric portion upon which the end of one shoe is mounted, a sleeve rotatably mounted on the pin and provided with an eccentric portion upon which the end of the other shoe is mounted, said pin and sleeve each being provided with a tool receiving portion for facilitating relative rotation of the pin and sleeve by a suitable tool, and releasable means for preventing the pin and sleeve from having free relative rotative movement.

WERNER F. BOLDT.